(12) United States Patent
Breitkreutz

(10) Patent No.: US 10,334,052 B2
(45) Date of Patent: Jun. 25, 2019

(54) SYSTEM AND METHOD FOR COMMUNICATING NEGOTIATED GROUPS OF PARAMETERS

(71) Applicant: Caterpillar Inc., Peoria, IL (US)

(72) Inventor: Travis O. Breitkreutz, Mapleton, IL (US)

(73) Assignee: Caterpillar Inc., Deerfield, IL (US)

( * ) Notice: Subject to any disclaimer, the term of this patent is extended or adjusted under 35 U.S.C. 154(b) by 270 days.

(21) Appl. No.: 15/337,615

(22) Filed: Oct. 28, 2016

(65) Prior Publication Data

US 2018/0124185 A1  May 3, 2018

(51) Int. Cl.
*G06F 15/16* (2006.01)
*H04L 29/08* (2006.01)
*H04L 29/06* (2006.01)

(52) U.S. Cl.
CPC ............ *H04L 67/141* (2013.01); *H04L 67/02* (2013.01); *H04L 67/145* (2013.01); *H04L 69/24* (2013.01); *H04L 67/42* (2013.01); *H04L 69/16* (2013.01); *H04L 69/28* (2013.01)

(58) Field of Classification Search
CPC ....... H04L 67/02; H04L 67/141; H04L 67/42; H04L 69/16; H04L 69/28; H04L 29/08
USPC ................................................ 709/203–248
See application file for complete search history.

(56) References Cited

U.S. PATENT DOCUMENTS

| 7,089,307 | B2 * | 8/2006 | Zintel ................. H04L 12/2803 709/203 |
| 7,130,895 | B2 * | 10/2006 | Zintel ................. H04L 12/2805 709/220 |
| 7,437,434 | B2 * | 10/2008 | Zintel ................. H04L 12/2803 709/220 |
| 8,086,669 | B2 | 12/2011 | Huster |
| 8,484,713 | B1 * | 7/2013 | Ravishankar .......... G06F 21/77 726/9 |
| 9,129,233 | B2 * | 9/2015 | Moughler .............. G06Q 10/06 |
| 9,215,131 | B2 | 12/2015 | Frey et al. |
| 10,075,388 | B2 * | 9/2018 | Garcia Aranda ..... H04L 47/724 |
| 2003/0028577 | A1 | 2/2003 | Dorland et al. |
| 2006/0063594 | A1 * | 3/2006 | Benbrahim ............. G07F 17/32 463/42 |

(Continued)

*Primary Examiner* — Moustafa M Meky
*Assistant Examiner* — Thorne E Waugh
(74) *Attorney, Agent, or Firm* — Finnegan, Henderson, Farabow, Garrett & Dunner, LLP

(57) ABSTRACT

A computer-implemented method for negotiating the communication of groups of parameters between a server and a client includes sending a first request for a parameter negotiating session from the client to the server using HTTP, specifying the client's desired session timeout for the session in the first request, receiving at the client an XML-formatted message sent from the server via HTTP specifying whether the server is able to support the requested session, and sending from the client a second request with an XML-formatted message via HTTP for a group of parameters desired from the server, wherein the second message includes the client's desired destination address, the client's desired update period for receiving updated parameter data, identification of a UDP port of the client for receipt of updated parameter data from the server in a UDP datagram, and identifiers of parameters desired by the client.

20 Claims, 4 Drawing Sheets

(56) References Cited

U.S. PATENT DOCUMENTS

| | | | |
|---|---|---|---|
| 2007/0174429 A1* | 7/2007 | Mazzaferri | G06F 3/1415 709/218 |
| 2008/0155055 A1* | 6/2008 | Shan | H04L 12/14 709/217 |
| 2011/0145319 A1* | 6/2011 | Dolan | H04L 47/72 709/203 |
| 2013/0031257 A1* | 1/2013 | Klein | H04L 65/1016 709/227 |
| 2013/0159473 A1* | 6/2013 | Newton | H04L 67/2852 709/219 |
| 2014/0059168 A1 | 2/2014 | Ponec et al. | |
| 2015/0222703 A1 | 8/2015 | Kärkkäinen et al. | |
| 2016/0034836 A1 | 2/2016 | Leem et al. | |
| 2016/0147883 A1 | 5/2016 | Mukundan et al. | |

\* cited by examiner

SYSTEM AND METHOD FOR COMMUNICATING NEGOTIATED GROUPS OF PARAMETERS

TECHNICAL FIELD

This application relates to a system and method for communicating groups of parameters, and more particularly, to a system and method for communicating negotiated groups of parameters.

BACKGROUND

Machines such as, for example, wheel loaders, motor graders, track-type tractors, dump trucks, and other types of machinery are used to perform a variety of tasks associated with an industry such as, mining, construction, manufacturing, transportation, or any other such industry. In order to perform these tasks, a machine may include a plurality of systems and each system may have one or more controllers, such as electronic control units (ECUs) or electronic control modules (ECMs). The ECMs may form a network and may be in communication with each other via one or more data links.

A particular function performed by the machine may involve several ECMs. ECMs on machines may be consumers of a great number of different parameters, such as temperatures, pressures, flow rates, gas compositions, relative positions of components, operator inputs, signals indicative of activation or deactivation of various actuators and/or valves, geographical location of the machine, and other sensed and/or calculated data associated with operation of the machine. Parameters that may be requested by one or more ECMs in order to determine control commands for performing various operational aspects of the machine's functions may be obtained from one or more producers of the relevant data. The producers of the relevant data may include sensory devices on-board the machine, sensory devices off-board the machine, one or more other ECMs, processors, or other computing devices on-board or associated with the machine, an operator station, a central control station, and other sources of data received from databases over wired or wireless networks, such as local area networks (LAN), wireless local area networks (WLAN), wide area networks (WAN), Wi-Fi networks, local job site wired and wireless networks, and the Internet.

A method for determining defects per unit of a product and retrieving product test data simultaneously from various data sources is described in U.S. Patent Application Publication No. 2016/0147883 to Mukundan et al. ("the '883 publication"). The '883 publication describes a method that generates a data retrieval session between a processor and a database server. Product test data is retrieved from the database server based on a query executed by the processor. Data updating sessions are also generated between the database server and a plurality of data sources.

Although the techniques described in the '883 publication may be effective for improving retrieval of accurate test data, further improvements in the efficiency and accuracy of the exchange of parameter data used to control and monitor the operations of various machines and machine components may still be beneficial. Existing methods of retrieving parameter data needed by various machine components such as electronic control modules (ECMs) generally require a priori knowledge of a statically defined set of parameters for which the data will be requested. This may result in a lack of flexibility and adaptability in updating the parameters for which data is required. Existing methods of communicating the parameter data required by various machine components may also lack backwards compatibility for new or upgraded components when various sources of the parameter data lack the capability to provide the requested parameter data to the replacement components.

The disclosed system and method for communicating negotiated groups of parameters are directed towards overcoming one or more of the shortcomings set forth above.

SUMMARY

In one aspect, a computer-implemented method is disclosed for negotiating the communication of groups of parameters between a server and a client. The method may include sending a first request for a parameter negotiating session from the client to the server using HTTP, specifying the client's desired session timeout for the session in the first request, receiving at the client an XML-formatted message sent from the server via HTTP specifying whether the server is able to support the requested session, and sending from the client a second request with an XML-formatted message via HTTP for a group of parameters desired from the server, wherein the message includes the client's desired destination address, the client's desired update period for receiving updated parameter data, identification of a UDP port of the client for receipt of updated parameter data from the server in a UDP datagram, and identifiers of parameters desired by the client. The method may also include receiving at the client an XML-formatted message sent from the server via HTTP specifying whether the server is able to support the second request received from the client, and if the server is able to support the second request, receiving at the client via HTTP an XML-formatted message from the server including a server-supported group of parameters based on the parameters desired by the client. The method may still further include receiving at the UDP port of the client a UDP datagram including updated parameter data corresponding to each of the server-supported parameters after a server-supported update period corresponding to the client's desired update period.

In another aspect, a communication system is disclosed, wherein the communication system is configured for dynamically negotiating groups of machine operational parameters to be communicated from a producer of the parameters to a consumer of the parameters on a machine, and periodically communicating updated parameter data to the consumer of the parameters. The communication system may include a processor associated with the consumer of the parameters on the machine. The processor may be configured to send a first request for a parameter negotiating session from the consumer to the producer using HTTP, specify the consumer's desired session timeout for the session in the first request, receive at the consumer an XML-formatted message sent from the producer via HTTP specifying whether the producer is able to support the requested session, and send from the consumer a second request with an XML-formatted message via HTTP for a group of parameters desired from the producer, wherein the message includes the consumer's desired destination address, the consumer's desired update period for receiving updated parameter data, identification of a UDP port of the consumer for receipt of updated parameter data from the producer in a UDP datagram, and identifiers of parameters desired by the consumer. The processor may also be configured to receive at the consumer an XML-formatted message sent from the producer via HTTP specifying whether the producer is able to support the second request received from the consumer, and if the producer is able to support the second request, receive at the consumer via HTTP an XML-formatted message from the producer including a producer-supported group of parameters based on the parameters desired by the consumer. The processor may also be configured to receive at the UDP port of the consumer a UDP datagram including updated data corresponding to each of the producer-supported parameters after a producer-supported update period corresponding to the consumer's desired update period.

In yet another aspect, a machine is disclosed, wherein the machine may include a machine component, and a client processor associated with the machine component. The client processor may be configured to consume a first group of machine operational parameters for controlling and monitoring functioning of the machine component. The client processor may also be configured to communicate with a server processor, wherein the server processor may be configured to produce a second group of machine operational parameters related to the functioning and status of the machine component. The client processor may be still further configured to send a first request for a parameter negotiating session from the client processor to the server processor using HTTP, specify the client processor's desired session timeout for the session in the first request, receive at the client processor an XML-formatted message sent from the server processor via HTTP specifying whether the server processor is able to support the requested session, and send from the client processor a second request with an XML-formatted message via HTTP for a group of parameters desired from the server processor, wherein the message includes the client processor's desired destination address, the client processor's desired update period for receiving updated parameter data, identification of a UDP port of the client processor for receipt of updated parameter data from the server processor in a UDP datagram, and identifiers of parameters desired by the client processor. The client processor may also be configured to receive at the client processor an XML-formatted message sent from the server processor via HTTP specifying whether the server processor is able to support the second request received from the client processor, and if the server processor is able to support the second request, receive at the client processor via HTTP an XML-formatted message from the server processor including a server processor-supported group of parameters based on the parameters desired by the client processor. The client processor may be still further configured to receive at the UDP port of the client processor a UDP datagram including updated data corresponding to each of the server processor-supported parameters after a server processor-supported update period corresponding to the client processor's desired update period.

DETAILED DESCRIPTION

Figure 1:
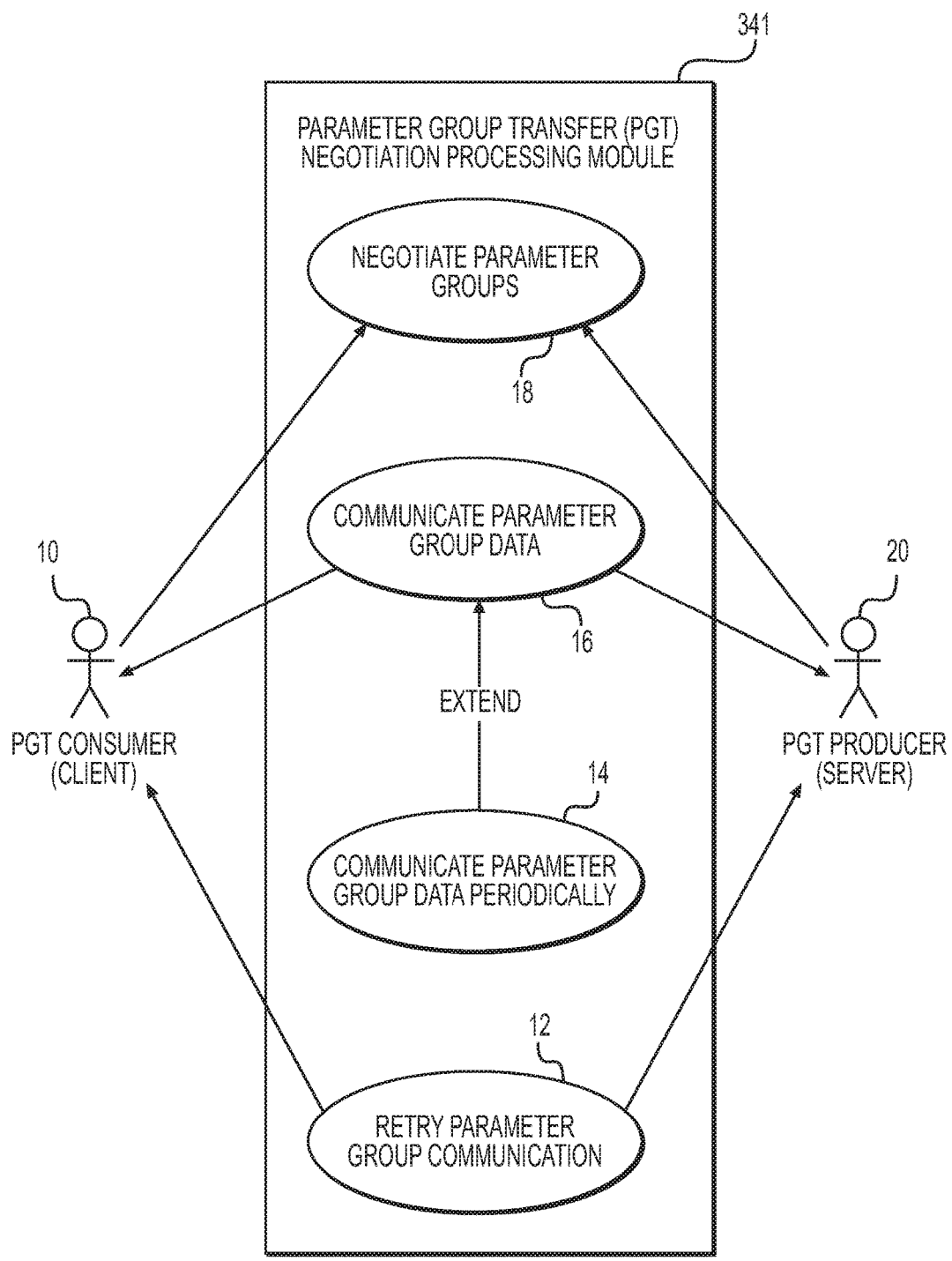
FIG. 1 is a schematic representation of an exemplary communication system enabling a negotiation session between a parameter group transfer (PGT) producer and a PGT consumer in a disclosed embodiment.

FIG. 1 illustrates a representation of an exemplary communication system that enables a producer of a group of parameters to negotiate over a network with a consumer of a group of parameters and communicate a negotiated group of parameters between a server that is inside the network and a client that is inside the network. A parameter group transfer (PGT) refers to the feature that allows a PGT client 10 to request and receive parameter values across a communication network from a PGT server 20. The PGT client 10 may be an object inside the communication system acting as an agent for the consumer of a desired group of parameters. Although FIG. 1 schematically represents the PGT consumer and client with one symbol, the PGT consumer may be an actor outside of the communication system who wishes to receive parameter data from the PGT producer. Similarly, the PGT server 20 may be an object inside the communication system acting as an agent for the producer of a group of parameters. The PGT producer may be an actor outside of the communication system who is able to supply parameter data to any PGT consumer who wishes to receive the data. The PGT server 20 may pull updated parameter data from the PGT producer and communicate the data to the PGT consumer via the PGT client 10.

Communication between a PGT producer and a PGT consumer may occur across a variety of different interconnected wired and wireless networks, including local area networks (LAN), wide area networks (WAN), ethernet, cellular networks, and the Internet. When initiating a communication session between a PGT producer and a PGT consumer across the Internet or World Wide Web (WWW), HyperText Transfer Protocol (HTTP) is an application-level protocol for retrieving interlinked resources. HTTP specifies the standard for requests and responses between a client and a server. In various exemplary embodiments of the present disclosure, HTTP clients interested in establishing a PGT negotiation session with an HTTP server may include end-user software tools incorporated into ECMs or processors associated with one or more machines or machine components. These PGT clients make requests on behalf of users or other PGT consumers in accordance with the HTTP standard. Examples of HTTP servers that may act as the agents for PGT producers may also include Web servers hosting secure Web pages that are accessible to authorized parties such as machine owners, original equipment manufacturers, suppliers, distribution centers, authorized machine repair centers, technicians, and other third parties. The HTTP servers may also include servers of other networked resources such as other ECMs and central processing units (CPUs) associated with other machines or machine components interconnected across the Internet or over other networks. In some embodiments of this disclosure, the PGT servers may include CPUs located at a central command center that respond to HTTP requests from a PGT client in the form of one or more machine components.

The communication system according to various exemplary implementations of this disclosure enables dynamic negotiation of the groups of parameters that will be exchanged between a PGT server and a PGT client, without requiring the establishment of a static set of parameters beforehand. The use of HTTP enables flexibility in the adaptation and structuring of communication capabilities of various machine components that may need to exchange parameter data during machine operation, and allows for backward compatibility between machine components when some of the components must be replaced or upgraded. The use of HTTP for the dynamic negotiation of groups of parameters to be exchanged between a PGT server and a PGT client also saves bandwidth and enables the dynamic structuring of request and response messages tailored to provide only the desired parameters at any particular time or update period. According to further aspects of exemplary embodiments of the disclosed communication system, after a group of parameters has been negotiated between a PGT server and a PGT client, data for the group of parameters may then be updated and communicated on a periodic basis from the PGT server to the PGT client using a message-based connectionless protocol such as User Datagram Protocol (UDP). According to further implementations of the disclosed communication system, any negotiation session between a PGT server and a PGT client may include the negotiation of more than one group of parameters. Each negotiated parameter group may include its own negotiated parameters, which may or may not be the same as negotiated parameters in another negotiated group of parameters, and additional UDP ports at the PGT client may be configured for receipt of periodic updates to values for those negotiated parameters. Additionally, unique update periods may be negotiated for providing updates to the values of the negotiated parameters in each of the negotiated parameter groups.

Typically, when an HTTP client initiates an HTTP request, it first establishes a Transmission Control Protocol (TCP) connection to a dedicated port on an HTTP server. TCP connection establishment uses a three-way handshake. First the PGT client initiates the connection establishment by sending a connection request to the PGT server. In response, the server replies with an acknowledgement of the connection request. Finally, the client sends an acknowledgement back to the server for the receipt of the server's acknowledgement. At this point, the TCP connection between the client and the server is established, and the client and server can begin data transfer to each other through the established TCP connection. Various implementations of this disclosure employ UDP for data transfer of periodically updated parameter data rather than requiring the establishment of a TCP connection between the client and the server. The messages carrying the updated parameter data after the parameters have been negotiated can be efficiently exchanged using a message-based connectionless protocol that does not require hand-shaking dialogues for guaranteeing reliability, ordering, or data integrity. With UDP, applications can send messages, in this case referred to as datagrams, to other hosts on an Internet protocol (IP) network without requiring prior communications to set up special transmission channels or data paths. Therefore, after dynamic establishment of one or more negotiated groups of parameters to be exchanged between the PGT server and the PGT client via HTTP, periodic updates to the data for the negotiated parameters can be efficiently and rapidly communicated to the clients, such as various machine components, using UDP. The data provided in UDP messages may be formatted as binary data with a session header and a message body containing parameter data. The data in the UDP messages may be parsed based on the identifiers of parameters that have already been negotiated via HTTP between the PGT server and the PGT client. Each UDP message with updates to the data associated with each negotiated parameter includes multiple data fields, which may contain the session-group header and binary data formatted according to the parameter definitions.

Figure 2:
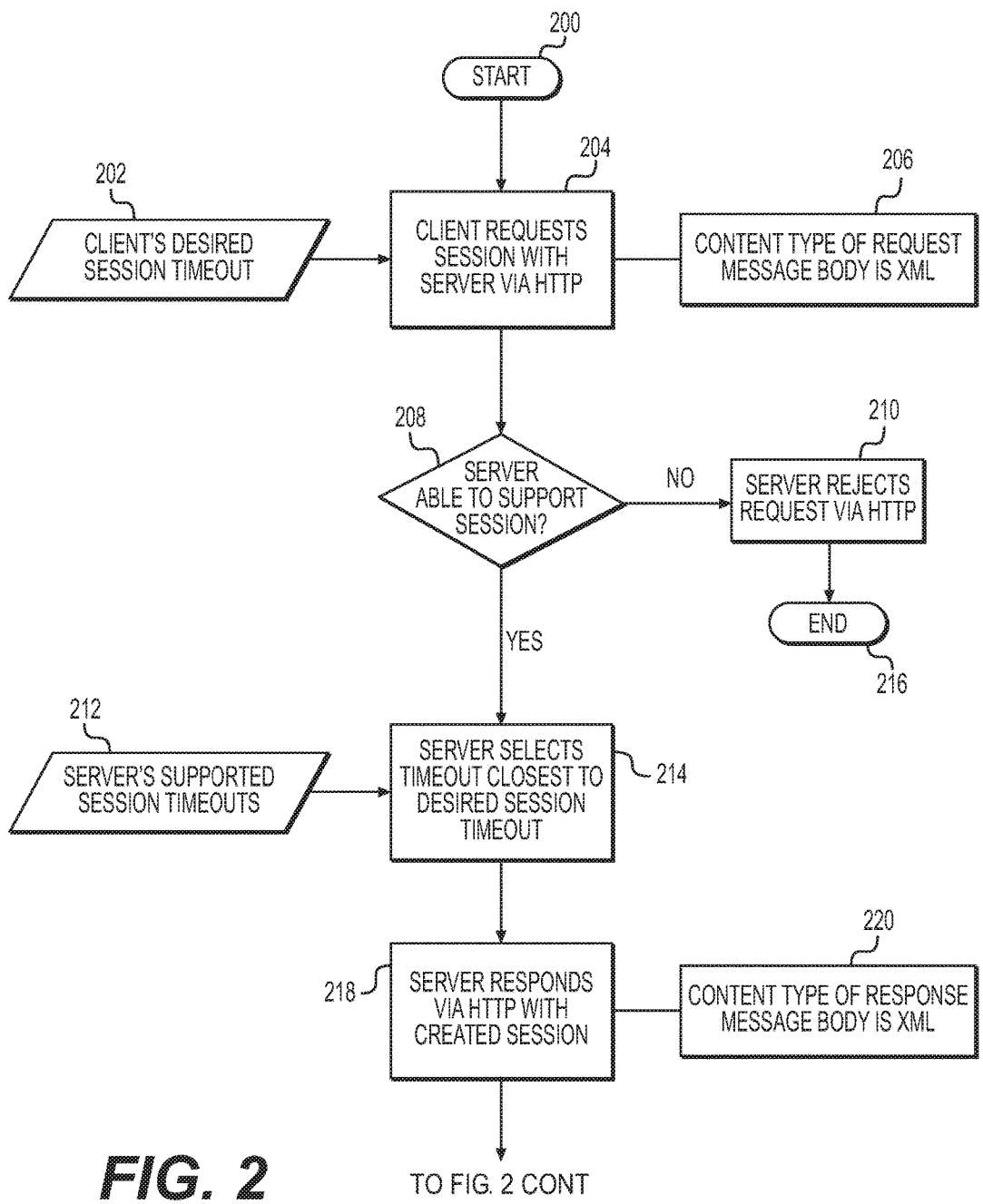
FIG. 2 (and FIG. 2 CONT) illustrates a flowchart depicting an exemplary disclosed negotiation session between a PGT producer and a PGT consumer.
Figure 2:
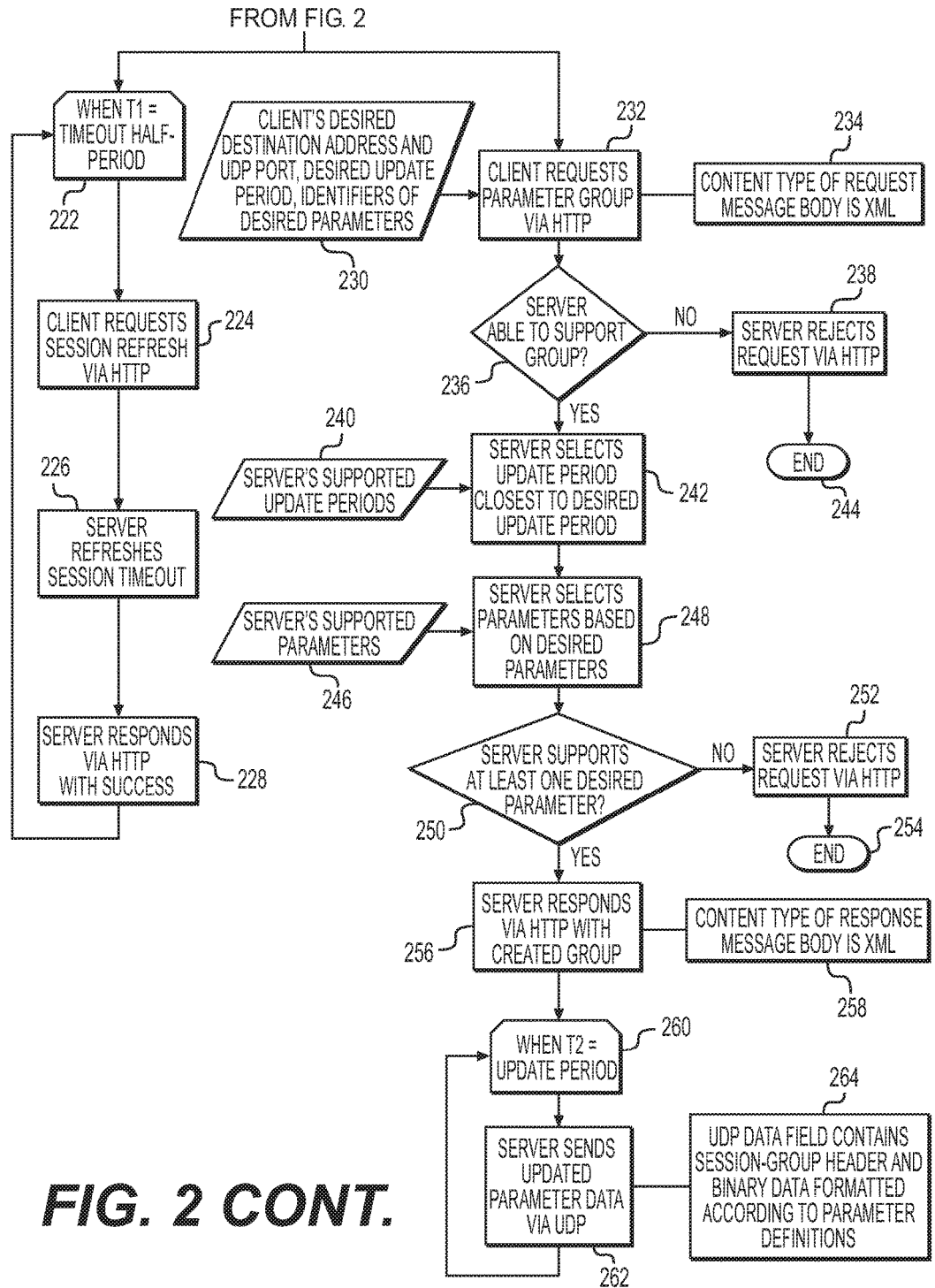

In the exemplary embodiment shown in FIG. 1, a negotiation between the PGT server 20 and the PGT client 10 may occur using HTTP requests and responses sent and received via a parameter group transfer (PGT) negotiation processing module 341. The PGT negotiation processing module 341 may be configured to facilitate negotiation of the parameters that will be communicated between the PGT client 10 and the PGT server 20 in a subroutine or module "Negotiate Parameter Groups" 18. One of ordinary skill in the art will recognize that the various illustrated subroutines or modules shown as part of the PGT negotiation processing module 341 in FIG. 1 may be included as software, hardware, firmware, or combinations thereof. The functionality of the PGT negotiation processing module 341 may also be at least partially or entirely incorporated into one or both of the PGT client and the PGT server. The negotiated parameter groups may be communicated with the assistance of another subroutine or module "Communicate Parameter Group Data" 16. Once an initial group of parameters has been negotiated and communicated between the client 10 and the server 20, the group of parameters may be periodically updated utilizing another subroutine or module "Communicate Parameter Group Data Periodically" 14. Finally, the communication of parameter groups between the client 10 and the server 20 may be retried if initial attempts to arrive at a negotiated group of parameters fail, utilizing yet another subroutine or module "Retry Parameter Group Communication" 12. FIG. 2 illustrates a flowchart with the steps that may be performed in an exemplary implementation of the negotiation of groups of parameters to be exchanged between a PGT server and a PGT client, and in the periodic update of data for the negotiated parameters that is communicated to the PGT client. The details of the exemplary sequence of steps illustrated in FIG. 2 will be discussed in the following section.

Figure 3:
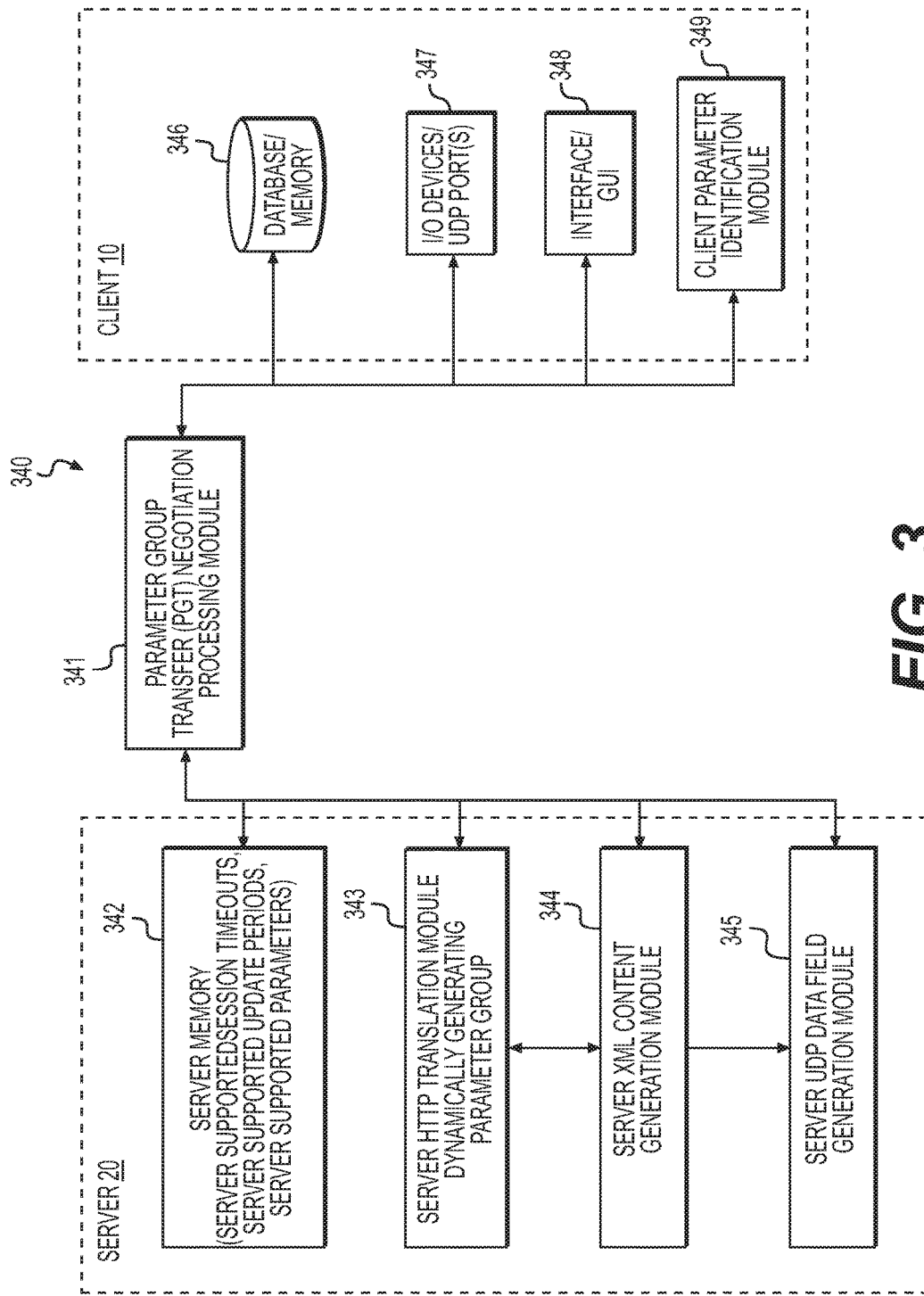
FIG. 3 illustrates additional features of the exemplary communication system of FIG. 1.

FIG. 3 shows one exemplary embodiment of the exemplary communication system 340 represented in FIG. 1. The PGT server 20 may be configured to include a server memory 342, a server HTTP translation module 343, a server Extensible Markup Language (XML) generation module 344, and a server User Datagram Protocol (UDP) data field generation module 345. The server memory 342 may be configured to store server supported session timeouts, server supported update periods, and server supported parameters. Because the disclosed communication system does not require the establishment of a statically defined group of parameters, and each client can dynamically negotiate for only the specific parameters that are needed at any particular time, there is a possibility that a particular client may drop out of communication with a server, either intentionally or by accident. In this situation the server's resources may be better directed to other uses rather than continuing to attempt to send updated parameter data to the client that no longer needs or desires updated data for the negotiated parameters. Therefore, each client may benefit from the ability to specify desired session timeouts. Each client may also be configured to communicate "keep alive" messages to a server by pinging the server on a periodic basis if the client continues to want updates for data associated with negotiated parameters.

XML is a system for annotating a document in a manner distinguishable from text in the document, and in accordance with a set of rules that encode the document in a format that is both human-readable and machine-readable. According to various implementations of this disclosure, the content type of the request and response message bodies exchanged between the PGT server 20 and the PGT client 10 may be XML. The PGT server 20 may be configured to generate a response to the PGT client 10 in the form of an XML-formatted message, which can be communicated to the PGT client via HTTP. Updates of the parameter data communicated between the PGT server 20 and the PGT client 10 may be sent with a UDP data field containing a session-group header and binary data formatted according to parameter definitions. The server UDP data field generation module 345 is configured to enable the exchange of the messages including periodically updated parameter data directly to the client's destination address and identified UDP port.

The PGT client 10 may be configured to include one or more databases and/or memories 346. The PGT client may also include a plurality of input/output (I/O) devices, including one or more UDP ports 347, a user interface, such as a graphical user interface (GUI) 348, and a client parameter identification module 349. The client parameter identification module 349 is configured to provide identifiers of the desired parameters to be negotiated with the PGT server 20 via the PGT negotiation processing module 341. The client parameter identification module 349 may be configured to dynamically update the group of desired parameters in real-time depending on the specific needs of the associated machine or machine component at any point in time or under specific operating conditions. As discussed above, these dynamic negotiations are efficiently conducted via HTTP. During the negotiation sessions between the PGT server 20 and the PGT client 10, the PGT server 20 may determine that some or all of the parameters requested by the PGT client for any particular group of parameters are not supported by the PGT producer, and therefore the PGT server 20 is not able to accept the request received from the PGT client via HTTP. In some implementations, the negotiated parameters included in a particular negotiated group of parameters may not be supported by the PGT server, while parameters in a different group of parameters being negotiated during the same session are supported by the PGT server. As a result, when multiple groups of parameters are being negotiated between a PGT server and a PGT client during the same negotiation session, some of the groups may not be supported, while other groups of parameters are supported.

The parameters successfully negotiated and communicated between the PGT producer (server) 20 and the PGT consumer (client) 10 may include all types of measured and calculated data related to the operation of various machines and machine components. Machine, as the term is used herein, refers to a fixed or mobile machine that may perform some type of operation associated with a particular industry, such as mining, construction, farming, etc., that operates between or within work environments (e.g., a construction site, mine site, power plant, etc.) An example of a fixed machine includes an engine system operating in a plant or off-shore environment (e.g., off-shore drilling platform). An example of a mobile machine includes any commercial machine, such as a truck, crane, earth moving vehicle, mining vehicle, backhoe, material handling equipment, farming equipment, on-highway vehicle, or any other movable machine that operates in a work environment.

A machine may include one or more machine components, devices, or systems that cooperate to control and/or monitor operations associated with the machine. For instance, the machine may include, among other things, one or more electronic control modules (ECMs), a configuration synchronization system, and a display device or other form of user interface. The ECMs may be configured to monitor and/or control an operation associated with one or more components of the machine. For example, the ECMs may each receive data indicative of operational characteristics associated with a particular component collected by one or more monitoring devices and/or sensors during an operation of the machine. In one exemplary implementation, an ECM may be associated with an internal combustion engine on the machine to monitor and/or control an operation of the engine. In particular, a ECM may be operable to monitor and/or control an exhaust pressure of the engine, a flow rate or temperature of fluid flowing through the cooling system of the engine, an air/fuel mixture supplied to a combustion chamber, a gas sensor of an exhaust system of the engine, or any other function of the internal combustion engine. Additional control aspects of one or more ECMs may be associated with an exhaust regeneration system associated with a machine. For example, an ECM may be operable to monitor and/or control a particulate sensor associated with a particulate trap, a regenerative element associated with a particular filter, an exhaust flow sensor associated with the exhaust system, or any other aspect associated with the regeneration system.

One or more of the ECMs may include a processor that functions as the PGT server, and another ECM or machine component may include a processor that functions as the PGT client. Alternatively or in addition, at least one of the PGT server and the PGT client may be completely separate from any of the ECMs or machine components that directly control or perform various functions of the machine. One purpose of the communication system including a PGT server, a PGT client, and a PGT negotiation processing module is to facilitate the dynamic negotiation of a group of parameters to be communicated to the client from the server, and the efficient periodic update of data associated with the negotiated parameters. The disclosed communication system also allows the server and the client to negotiate session timeouts, update periods at which the agreed-upon group of parameters are updated based on new data, and which parameters will be included in the communicated groups of parameters.

Each of the PGT server and the PGT client may include one or more processors that can execute instructions and process data to perform one or more processes associated with the disclosed communication system. For instance, processors associated with each of the server and the client may execute software that enables a configuration synchronization system to request and/or receive configuration data from one or more control modules. The processors may update the operational parameters associated with the configuration synchronization system based on the received configuration data and the determined machine type. The processors may also execute software that collects and distributes operation data to one or more off-board systems based on the configuration data.

INDUSTRIAL APPLICABILITY

The disclosed embodiments of the communication system 340 for negotiating and communicating groups of parameters between the PGT server 20 and the PGT client 10 may provide increased efficiency, adaptability, and reliability in the exchange of data associated with various operational parameters used in controlling and monitoring the functioning of various machines and machine components. Machine components such as ECUs, ECMs, and other devices that rely on accurate and timely inputs and updates of various forms of sensed data may benefit from the ability of the communication system according to this disclosure to dynamically negotiate exactly what parameters are needed at any particular time. Dynamic negotiation between a parameter group producer and a parameter group consumer may be performed rapidly, spontaneously, and with a minimum of required bandwidth by sending request and response messages between a PGT server associated with the PGT producer and a PGT client associated with the PGT consumer via HTTP. The use of HTTP also ensures that as new machines are added to a fleet of machines, new machine components are added to a machine, or existing machines or machine components are repaired or updated, the disclosed communication system will provide backward compatibility between the client components with their desired groups of parameters and a server associated with a producer or originator of groups of parameters.

In the exemplary embodiments of a communication system according to this disclosure, the request and response messages exchanged via HTTP between the PGT client 10 and the PGT server 20 during initial negotiations to determine exactly what parameters will be included in the parameter group transfer may also be structured with XML format in the bodies of the messages. After negotiations have resulted in identification of particular parameters to be exchanged in one or more groups of parameters, updated parameter data associated with the negotiated parameters may be sent to the PGT client 10 using User Datagram Protocol (UDP) messages, thereby greatly enhancing the efficiency and timeliness of the updates.

Referring to FIG. 2, a flowchart is shown of exemplary steps that may be performed by the PGT negotiation processing module 341 of the communication system 340 illustrated in FIGS. 1 and 3 during a negotiation session between a PGT server 20 and a PGT client 10. After the start 200, one or more PGT clients may request a negotiation session with one or more PGT servers via HTTP (Step: 204). The PGT client(s) may retrieve desired session timeouts from database/memory 346 (Step: 202), and the request message(s) sent to the PGT server 20 via the PGT negotiation processing module 341 may include XML-formatted content with identification of the client's desired session timeouts (Step: 206). Following receipt of a request message via HTTP at the PGT server, the server may determine whether available resources allow the server to conduct the negotiation session with the client (Step: 208). If the server is not able to support the session at the time of receipt of the request (Step: 208=No), the server may send a rejection response message back to the client via HTTP (Step: 210) and the initial attempts to establish a negotiation session may terminate at Step 216. As discussed above, each negotiation session between a PGT client and a PGT server may include the negotiation of more than one group of parameters, each with its own negotiated parameters, associated UDP port on the PGT client for receipt of updates to values for the negotiated parameters, and requested update period.

If the server determines that it is able to support the session request from the client (Step: 208=Yes), the server may then select a session timeout closest to the client's desired session timeout (Step: 214) from the server's supported session timeouts stored in the server memory 342 (Step: 212). The server may then send a response message back to the client via HTTP creating one or more negotiation sessions having the server's supported timeout (Step: 218), and the content of the response message may be provided in an XML format (Step: 220).

In the exemplary negotiation session illustrated in the flowchart of FIG. 2, the PGT negotiation processing module 341 may identify a time T1 equal to half of the timeout selected by the server during each negotiation session (Step: 222), and notify the client when time=T1 such that the client may then request a session refresh from the server via HTTP (Step: 224). The server may refresh the session timeout at the half-way point of a server-supported timeout, or any other selected fraction of a selected timeout (Step: 226) and then respond to the client via HTTP to notify the client of success with the refresh of the session timeout (Step: 228).

After a negotiation session has been established between a PGT server and a PGT client, the client may send a message to the server via HTTP requesting a particular group of parameters (Step: 232). The client may retrieve the client's desired destination address and UDP port, desired update periods for receiving updates to the data associated with each parameter, and the identifiers of the desired parameters from the client's database/memory 346 (Step: 230). The content type of the request message sent from the client to the server may be formatted as XML (Step: 234). The server may evaluate the request message and determine whether the server currently has the resources to support the client's desired group of parameters (Step: 236). If the server is not able to support the requested group of parameters (Step: 236=No), the server may then respond to the client with a rejection of the request via HTTP (Step: 238), resulting in the termination of the attempted negotiation session at Step: 244. However, if the server is able to support the requested group of parameters (Step: 236=Yes), the server may then select data update periods that are closest to the client's desired update periods (Step: 242), with the server retrieving the server's supported update periods from the server memory 342 (Step: 240).

After having selected server update periods closest to the client's desired update periods, the server may then select parameters based on the client's desired parameters to include in the group of parameters (Step: 248). The server may retrieve the selected parameters from the server's supported parameters stored in the server memory 342 (Step: 246). If the server determines that it does not support at least one of the client's desired parameters (Step: 250=No), then the server may respond to the client via HTTP, rejecting the client's request for a parameter group (Step: 252), resulting in the termination of the negotiation session at Step: 254. However, if the server determines that it does support at least one of the client's desired parameters (Step: 250=Yes), then the server may respond to the client via HTTP with the created group of parameters (Step: 256), with the content type of the response message being formatted in XML (Step: 258).

Following the creation of a successfully negotiated group of parameters for which data will be communicated from the server to the client (Step: 256), and after the server's selected update period closest to the client's desired update period has elapsed (Step: 260), the server may then send updated parameter data via UDP to the client's UDP port (Step: 262). The UDP data field in each message sent to the client may contain a session-group header identifying the negotiation session and the group of negotiated parameters. The UDP message also includes the actual data associated with each negotiated parameter in the form of binary data formatted according to parameter definitions for the negotiated parameters. One of ordinary skill in the art will understand that variations to the above-described sequence of steps may be included in various exemplary implementations of the communication system according to this disclosure. Additionally, the functionality implemented by some or all of the various steps may be included in one or more processors that are part of any one or more of the PGT client 10, the PGT server 20, and the PGT negotiation processing module 341.

It will be apparent to those skilled in the art that various modifications and variations can be made to the disclosed communication system 340 without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A computer-implemented method for negotiating the communication of groups of parameters between a server and a client, the method comprising:

sending a first request for a parameter negotiating session from the client to the server using HyperText Transfer Protocol (HTTP), wherein parameters to be negotiated and communicated between the server and the client include measured and calculated data related to operation of various machines and machine components;

specifying the client's desired session timeout for the session in the first request;

receiving at the client an Extensible Markup Language (XML)-formatted message sent from the server via HTTP specifying whether the server is able to support the requested session, and if the server is able to support the requested session, including a session timeout closest to the client's desired session timeout and selected from server-supported session timeouts stored in a server memory;

sending from the client to the server a second request with an XML-formatted message via HTTP for a group of parameters desired from the server, wherein the message includes the client's desired destination address, the client's desired update period for receiving updated parameter data, identification of a User Datagram Protocol (UDP) port of the client for receipt of updated parameter data from the server in a UDP datagram, and identifiers of parameters desired by the client;

receiving at the client an XML-formatted message sent from the server via HTTP specifying whether the server is able to support the second request received from the client;

if the server is able to support the second request, receiving at the client via HTTP an XML-formatted message from the server including a server-supported group of parameters based on the parameters desired by the client and selected from server-supported parameters stored in a server memory; and receiving at the UDP port of the client a UDP datagram including updated parameter data corresponding to each of the server-supported parameters after a server-supported update period corresponding to the client's desired update period.

2. The computer-implemented method of claim 1, wherein the client receives an XML-formatted response from the server via HTTP specifying that the server is not able to support the requested parameter negotiating session with the client in response to the first request.

3. The computer-implemented method of claim 1, wherein the client receives an XML-formatted response from the server via HTTP specifying that the server is not able to support the requested parameter negotiating session with the client in response to the second request.

4. The computer-implemented method of claim 1, wherein the client receives an XML-formatted response from the server via HTTP specifying a server-selected session timeout that is the closest available session timeout to the client's desired session timeout from server-supported session timeouts.

5. The computer-implemented method of claim 1, wherein the client receives a XML-formatted response from the server via HTTP specifying a server-selected update period that is the closest available update period to the client's desired update period from server-supported update periods.

6. The computer-implemented method of claim 1, wherein the client receives a XML-formatted response from the server via HTTP specifying a server-selected group of parameters based on the client's desired group of parameters.

7. The computer-implemented method of claim 1, wherein the client receives a XML-formatted response from the server via HTTP specifying that the requested parameter negotiating session is terminated if the server is not able to support at least one of the parameters in the client's desired group of parameters.

8. The computer-implemented method of claim 1, wherein the client receives a XML-formatted response from the server via HTTP specifying a group of server-supported parameters based on the client's desired group of parameters and including at least one of the client's desired group of parameters.

9. The computer-implemented method of claim 8, wherein the client receives subsequent, updated responses from the server following server-supported update periods based on the client's desired update period, wherein each updated response is received as a UDP datagram containing parameter data at the client's UDP port.

10. A communication system configured for dynamically negotiating groups of machine operational parameters to be communicated from a producer of the parameters to a consumer of the parameters on a machine, and periodically communicating updated parameter data to the consumer of the parameters, the communication system comprising:

a processor associated with the consumer of the parameters on the machine, the processor being configured to:

send a first request for a parameter negotiating session from the consumer to the producer using HyperText Transfer Protocol (HTTP);

specify the consumer's desired session timeout for the session in the first request;

receive at the consumer an Extensible Markup Language (XML)-formatted message sent from the producer via HTTP specifying whether the producer is able to support the requested session, and if the producer is able to support the requested session, including a session timeout closest to the consumer's desired session timeout and selected from producer-supported session timeouts stored in a memory associated with the producer;

send from the consumer to the producer a second request with an XML-formatted message via HTTP for a group of parameters desired from the producer, wherein the message includes the consumer's desired destination address, the consumer's desired update period for receiving updated parameter data, identification of a User Datagram Protocol (UDP) port of the consumer for receipt of updated parameter data from the producer in a UDP datagram, and identifiers of parameters desired by the consumer;

receive at the consumer an XML-formatted message sent from the producer via HTTP specifying whether the producer is able to support the second request received from the consumer;

if the producer is able to support the second request, receive at the consumer via HTTP an XML-formatted message from the producer including a producer-supported group of parameters based on the parameters desired by the consumer and selected from producer-supported parameters stored in a memory associated with the producer; and receive at the UDP port of the consumer a UDP datagram including updated data corresponding to each of the producer-supported parameters after a producer-supported update period corresponding to the consumer's desired update period.

11. The communication system of claim 10, wherein the consumer receives an XML-formatted response from the producer via HTTP specifying that the producer is not able to support the requested parameter negotiating session with the consumer in response to the first request.

12. The communication system of claim 10, wherein the consumer receives an XML-formatted response from the producer via HTTP specifying that the producer is not able to support the requested parameter negotiating session with the consumer in response to the second request.

13. The communication system of claim 10, wherein the consumer receives an XML-formatted response from the producer via HTTP specifying a producer-selected session timeout that is the closest available session timeout to the consumer's desired session timeout from producer-supported session timeouts.

14. The communication system of claim 10, wherein the consumer receives a XML-formatted response from the producer via HTTP specifying a producer-selected update period that is the closest available update period to the consumer's desired update period from producer-supported update periods.

15. The communication system of claim 10, wherein the consumer receives a XML-formatted response from the producer via HTTP specifying a producer-selected group of parameters based on the consumer's desired group of parameters.

16. The communication system of claim 10, wherein the consumer receives a XML-formatted response from the producer via HTTP specifying that the requested parameter negotiating session is terminated if the producer is not able to support at least one of the parameters in the consumer's desired group of parameters.

17. The communication system of claim 10, wherein the consumer receives a XML-formatted response from the producer via HTTP specifying a group of producer-supported parameters based on the consumer's desired group of parameters and including at least one of the consumer's desired group of parameters.

18. The communication system of claim 17, wherein the consumer receives subsequent, updated responses from the producer following producer-supported update periods based on the consumer's desired update period, wherein each updated response is received as a UDP datagram at the consumer's UDP port.

19. A machine, comprising:
a machine component;
a client processor associated with the machine component, the client processor being configured to:
consume a first group of machine operational parameters for controlling and monitoring functioning of the machine component;
communicate with a server processor, wherein the server processor is configured to produce a second group of machine operational parameters related to the functioning and status of the machine component;
send a first request for a parameter negotiating session from the client processor to the server processor using HyperText Transfer Protocol (HTTP);
specify the client processor's desired session timeout for the session in the first request;
receive at the client processor an Extensible Markup Language (XML)-formatted message sent from the server processor via HTTP specifying whether the server processor is able to support the requested session, and if the server processor is able to support the requested session, including a session timeout closest to the client processor's desired session timeout and selected from server processor-supported session timeouts stored in a memory associated with the server processor;
send from the client processor to the server processor a second request with an XML-formatted message via HTTP for a group of parameters desired from the server processor, wherein the message includes the client processor's desired destination address, the client processor's desired update period for receiving updated parameter data, identification of a User Datagram Protocol (UDP) port of the client processor for receipt of updated parameter data from the server processor in a UDP datagram, and identifiers of parameters desired by the client processor;
receive at the client processor an XML-formatted message sent from the server processor via HTTP specifying whether the server processor is able to support the second request received from the client processor;
if the server processor is able to support the second request, receive at the client processor via HTTP an XML-formatted message from the server processor including a server processor-supported group of parameters based on the parameters desired by the client processor and selected from server processor-supported parameters stored in a memory associated with the server processor; and
receive at the UDP port of the client processor a UDP datagram including updated data corresponding to each of the server processor-supported parameters after a server processor-supported update period corresponding to the client processor's desired update period.

20. The machine of claim 19, wherein the client processor is further configured to:
receive a XML-formatted response from the server processor via HTTP specifying a group of server processor-supported parameters based on the client processor's desired group of parameters, and including at least one of the client processor's desired group of parameters; and
receive subsequent, updated responses from the server processor following server processor-supported update periods based on the client processor's desired update period, wherein each updated response is received as a UDP datagram containing parameter data at the client processor's UDP port.

* * * * *